United States Patent
Umehara et al.

(10) Patent No.: US 7,160,374 B2
(45) Date of Patent: Jan. 9, 2007

(54) FLAKY PIGMENTS COATED WITH A COUPLING AGENT AND A PERFLUOROALKYL PHOSPHATE

(75) Inventors: Eiji Umehara, Fukushima-ken (JP); Koushiro Kunii, Fukushima-ken (JP)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/467,784

(22) PCT Filed: Feb. 15, 2001

(86) PCT No.: PCT/EP01/01682

§ 371 (c)(1),
(2), (4) Date: Aug. 13, 2003

(87) PCT Pub. No.: WO02/064682

PCT Pub. Date: Aug. 22, 2002

(65) Prior Publication Data

US 2004/0069187 A1 Apr. 15, 2004

(51) Int. Cl.
*C09D 11/00* (2006.01)
*C04B 14/00* (2006.01)
*C09C 3/08* (2006.01)

(52) U.S. Cl. .................. 106/31.6; 106/401; 106/413; 106/415; 106/419; 106/426; 106/436; 106/438; 106/439; 106/443; 106/445; 106/447; 106/450

(58) Field of Classification Search ................ 106/401, 106/413, 415, 419, 426, 436, 438, 439, 443, 106/445, 447, 450, 31.6; 428/403–407
See application file for complete search history.

(56) References Cited

U.S. PATENT DOCUMENTS

| 4,828,623 A | 5/1989 | Nitta et al. |
| 5,004,825 A | 4/1991 | Yoshida et al. |
| 5,223,034 A | 6/1993 | Nitta et al. |
| 6,340,723 B1 * | 1/2002 | Nitta et al. .................. 524/430 |
| 6,462,115 B1 * | 10/2002 | Takahashi et al. .......... 524/263 |

FOREIGN PATENT DOCUMENTS

| EP | 0268918 A | 6/1988 |
| EP | 0288933 A | 11/1988 |
| EP | 0342533 A | 11/1989 |
| EP | 1090963 A | 4/2001 |

* cited by examiner

*Primary Examiner*—Helene Klemanski

(57) ABSTRACT

A flaky pigment excellent in leafing properties and in adhesion between pigment particles and a coating (resin) was obtained by coating the surface of a flaky pigment with a coupling agent and a phosphate having a perfluoroalkly group or a silane compound. Accordingly, the flaky pigment is excellent as a pigment for coating or printing ink of which brightness and durability are required.

20 Claims, No Drawings

FLAKY PIGMENTS COATED WITH A COUPLING AGENT AND A PERFLUOROALKYL PHOSPHATE

TECHNICAL FIELD

The present invention relates to a flaky pigment excellent in leafing properties and adhesion and in particular to a flaky pigment for coating and printing ink, which is coated with a coupling agent and an organic compound having a perfluoroalkyl group and is excellent in leafing properties and adhesion between flaky pigment particles and a coating layer.

BACKGROUND ART

Heretofore, a large number pearlescent pigments and metal pigments having the shape of leaf, when incorporated into coating compositions etc., form coatings of design based on brightness by uniformly dispersing flaky pigment particles in coating layers. Recently, the development of various flaky pigments of design having brightness like plating is advanced by allowing flaky pigment particles represented by leafing aluminum flake pigment to float on the surface of a coating (leafing properties or plane orientation) to further improve the brightness of the coating. For example, with respect to metal pigments, a pigment comprising flake copper powder coated with stearic acid (JP-A 8-188731) and a pigment comprising aluminum flakes whose surface has been treated with alkyl phosphates (JP-A 11-57605) have been proposed as pigments having leafing properties.

Further, with respect to pearlescent pigments, a resin film comprising pearlescent pigments coated with a silane compound has been proposed (JP-A 7-62151). This silane coating pigment was used to raise leafing properties and compatibility between pigment particles and resin in the resin film.

Among these known flaky pigments, there are pigments showing excellent characteristics in leafing properties, but the interlaminar adhesion between the pigment particles and the coated film is weak, and accordingly, there is a defect in durability when used as coatings. That is, even if the known flaky pigment particles float on the surface of the coating to achieve a desired design by brightness based on their leafing properties, the interlaminar adhesion between the flaky pigment particles and a clear coating coated thereon for the purpose of protection is so low that the clear coating is easily removed upon attaching and pulling a cellophane tape or the like. Thus, such pigments used in a coating fail to achieve durability required of the coating.

On one hand, it is also attempted that the adhesion between pigment particles and a clear coating layer is raised without reducing leafing properties by devising a coating technique in which just before coating, an organic solvent-type base coating containing a resin composition for coating is mixed with a dispersion of leafing aluminum flake pigments in an organic solvent (JP-A 11-128828).

On the other hand, pigments treated with phosphate compounds having perfluoroalkyl groups (JP-A 5-93153) or with silane compounds (JP-A 2-218603) or pigments treated simultaneously with these compounds having perfluoroalkyl groups and reactive organic silicon compounds (JP-A 8-217989) are also proposed, but both of the pigments are developed for the purpose of improving the water- and oil-repellency of the pigments, and these are pigments used mainly for cosmetics.

DISCLOSURE OF THE INVENTION

As a result of their eager study for developing a flaky pigment for coating or printing ink which is excellent in leafing properties and interlaminar adhesion between pigment particles and a protective coating, the present inventors found that a flaky pigment treated by coating the pigment with a coupling agent and a compound having a perfluoroalkyl group improves both leafing properties and interlaminar adhesion, and that it is excellent particularly as a pigment for coating and printing ink of which durability is required.

That is, the present invention provides a novel flaky pigment for resin composition described in items 1 to 6 below, which is excellent in leafing properties and interlaminar adhesion.

1. A flaky pigment for resin composition, which is coated with a coupling agent and an organic compound having a perfluoroalkyl group on the surface of the flaky pigment.
2. The flaky pigment for resin composition according to item 1 above, wherein the flaky pigment is one or more members selected from pearlescent pigments and metal pigments.
3. The flaky pigment for resin composition according to item 1 or 2 above, wherein the flaky pigment is a pigment in which hydrous zirconium oxide formed by hydrolysis of a zirconium compound in the presence of hypophosphite and/or a hydrous compound formed by hydrolysis of one or more water-soluble compounds of metals selected from cobalt, manganese and cerium has been deposited of the surface of a pearlescent pigment.
4. The flaky pigment for resin composition according to any one of items 1 to 3 above, wherein the organic compound having a perfluoroalkyl group is one or more members selected from compounds represented by the general formulae (I) to (III) below:

phosphates having a perfluoroalkyl group, represented by the general formula (I):

 (I)

wherein Rf represents a straight-chain or branched $C_6$ to $C_{21}$ perfluoroalkyl group or perfluoroalkyloxy group, M represents hydrogen, an alkali metal, ammonium and substituted ammonium, n is from 1 to 4, m is from 0 to 10, and y is from 1 to 3; phosphates having a perfluoroalkyl group, represented by the general formula (II):

 (II)

wherein Rf represents a straight-chain or branched $C_6$ to $C_{21}$ perfluoroalkyl group or perfluoroalkyloxy group, M represents hydrogen, an alkali metal, ammonium or substituted ammonium, R represents hydrogen or a $C_1$ to $C_3$ alkyl group, n is from 1 to 4, m is from 0 to 10, and y is from 1 to 3; and perfluoroalkyl silane represented by the general formula (III):

 (III)

wherein Rf represents a straight-chain or branched $C_1$ to $C_{12}$ perfluoroalkyl group, X may be the same or different and represents an alkoxy group, a halogen group or an alkyl group, provided that not all X groups should be alkyl groups, and n is from 1 to 5.

5. The flaky pigment for resin composition according to any one of items 1 to 4 above, wherein the coupling agent is one or more members selected from a silane coupling agent, a titanium-based coupling agent and a zirconium-based coupling agent.

6. The flaky pigment for resin composition according to any one of items 1 to 5 above, wherein the coverage amount of each of the coupling agent and the compounds represented by the general formulae (I) to (III) is 0.05 to 20% by weight relative to the flaky pigment.

BEST MODE CARRYING OUT THE INVENTION

Hereinafter, the embodiments of the flaky pigment for resin composition according to the present invention are described item by item in more detail.

1) The Flaky Pigment

Although the flaky pigment used in the flaky pigment for resin composition according to the present invention is not particularly limited, the present invention is directed in particular to flaky pearlescent pigments and metal pigments used for coating or printing ink. Here, the pearlescent pigments and metal pigments are classified according to the different concepts of function and material, so it should be noted that the same pigment or base material may fall under both the concepts.

The pearlescent pigments include single or complex metal oxide-coated mica based on flaky mica (natural and synthetic mica), for example, various kinds of titanium oxide-coated mica, iron oxide-coated mica, mica coated with a metal complex oxide consisting of titanium and an acid, and cobalt titanate-coated mica; metal oxide-coated graphite flakes based on flaky graphite, for example, titanium dioxide-coated graphite flakes; and various kinds of metal oxide-coated alumina flakes based on flaky alumina, for example, titanium dioxide-coated alumina flakes and iron oxide-coated alumina flakes, as well as metal oxide-coated silica flakes, metal oxide-coated glass flakes, metal-coated glass flakes, metal oxide-coated micaceous iron oxide, titanium dioxide-coated micaceous iron oxide, metal oxide-coated plate barium sulfate etc. The metal oxide-coated mica etc. are commercially available as Iriodin® from E. Merck etc.

Further, weatherable pearlescent pigments to which hydrous zirconium oxide formed by hydrolysis of a zirconium compound in the presence of hypophosphite and/or a hydrous oxide formed by hydrolysis of one or more water-soluble compounds of metals selected from cobalt, manganese and cerium has been deposited according to the present applicant (JP-A 63-130673 and JP-A 1-292067) are particularly suitable as the flaky pigment.

On the other hand, the metal pigments include e.g. aluminum flakes, micaceous iron oxide, brass, stainless steel flakes, titanium flakes, boron nitride flakes, copper powder etc.

The size of these flaky pigments is not particularly limited, and pigments with a size achieving desired utilities and desired hues and brightness are suitably selected from usually used pigments having a particle diameter of 2 to 200 µm and a thickness of 0.2 to 1.0 µm.

2) The Organic Compound Having a Perfluoroalkyl Group

As the compound having a perfluoroalkyl group, one or more compounds selected from phosphates represented by the general formula (I) or (II) and silane compounds represented by the general formula (III) are used in combination.

$$[Rf(C_nH_{2n}O)_m]_yPO(OM)_{3-y} \quad (I)$$

$$(RfSO_2NRC_nH_{2n}O)_yPO(OM)_{3-y} \quad (II)$$

wherein Rf represents a straight-chain or branched $C_6$ to $C_{21}$ perfluoroalkyl group or perfluoroalkyloxy group, M represents hydrogen, an alkali metal, ammonium or substituted ammonium, R represents hydrogen or a $C_1$ to $C_3$ alkyl group, n is from 1 to 4, m is from 0 to 10, and y is from 1 to 3. The substituted ammonium represented by M in both the formulae includes alkanol amines such as monoethanol amine and diethanol amine or basic amino acids.

Typical compounds of the general formulae (I) and (II) above include $(CF_3(CF_2)_7CH_2CH_2O)_2PO[ONH_2(CH_2CH_2OH)_2]$, $(CF_3(CF_2)_7SO_2N(C_3H_7)C_2H_4O)_2PO(OH)$ etc.

$$Rf(CH_2)_nSiX_3 \quad (III)$$

wherein Rf represents a straight-chain or branched $C_1$ to $C_{12}$ perfluoroalkyl group, X may be the same or different and represents an alkoxy group, a halogen atom and an alkyl group, provided that not all X groups should be alkyl groups, and n is from 1 to 5.

Examples of silane compounds of the general formula (III) are as follows:

$CF_3(CF_2)_7(CH_2)_2Si(OCH_3)_3$
$CF_3(CF_2)_{11}(CH_2)_2SiCl_3$
$CF_3(CF_2)_4(CH_2)_2SiCl_3$
$CF_3(CF_2)_2SiCl_3$
$CF_3(CF_2)_{10}(CH_2)_2Si(OCH_3)_3$
$CF_3(CF_2)_5(CH_2)_2Si(OCH_3)_3$
$CF_3(CF_2)_9(CH_2)_2Si(OC_2H_5)_3$
$CF_3(CF_2)_7(CH_2)_2Si(OC_2H_5)_3$
$CF_3(CF_2)_4(CH_2)_2Si(OC_2H_5)_3$
$CF_3(CF_2)_2(CH_2)_2Si(OC_2H_5)_3$
$CF_3(CH_2)_2Si(OCH_3)_3$

3) The Coupling Agent

The coupling agent used in the present invention is not particularly limited, and it is possible to use a silane-based coupling agent, a titanium-based coupling agent and a zirconium-based coupling agent, and the silane coupling agent is particularly preferable from an economical point of view. Typical compounds of each coupling agent are as follows:

A) Silane-based Coupling Agent

Methacryloxy alkoxypropyl trimethoxysilane,

γ-(2-aminoethyl)aminopropyl trimethoxysilane,

γ-(2-aminoethyl)aminopropylmethyl dimethoxysilane,

γ-methacryloxypropyl trimethoxysilane,

N-β-(N-vinylbenzylaminoethyl)-γ-aminopropyl trimethoxysilane,

γ-glycidoxypropyl trimethoxysilane,

γ-mercaptopropyl trimethoxysilane, vinyl triacetoxysilane,

γ-chloropropyl trimethoxysilane, octadecyldimethyl[3-(trimethoxysilyl)propyl]ammonium chloride, γ-mercaptopropylmethyl dimethoxycine, methyl trichlorosilane, dimethyl dichlorosilane, trimethyl chlorosilane, and vinyl trimethoxysilane.

In particular, γ-(2-aminoethyl)aminopropyl trimethoxysilane, γ-methacryloxypropyl trimethoxysilane, and γ-glycidoxypropyl trimethoxysilane are preferable.

B) Titanium-based Coupling Agent

Tetra(2,2-diallyloxymethyl-1-butyl)bis(di-tridecyl) phosphite) titanate, bis(dioctylpyrophosphate) oxyacetate titanate, and isopropyltri(N-aminoester-aminoethyl) titanate.

C) Zircoaluminate-based Coupling Agent

Carboxyzircoaluminate and methacryloxyzircoaluminate.

4) Coverage Amount

The coverage amount of each of the coupling agent and the compounds having a perfluoroalkyl group represented by the general formulae (I) to (III) above may be the same and is 0.05 to 20% by weight, preferably 0.05 to 15% by weight, relative to the flaky pigment.

If the coverage amount of each of these components is less than 0.05% by weight, it is not possible to achieve sufficient leafing effects and adhesion to a coating layer.

On the other hand, a coverage amount exceeding 20% by weight, although the desired leafing effects etc. can thereby be achieved, is meaningless from an economical point of view because no further improvement of the effects can be expected.

5) Process

Either a wet process or a dry process used in a conventional process for pigments can be used as the process for producing the flaky pigment for resin composition according to the present invention. However, because pigments having even characteristics can be obtained easily and effectively and subsidiary materials can be easily handled, the wet process in an aqueous system is most appropriate as the process for producing the flaky pigment according to the present invention.

One example of the process by the wet process is outlined as follows. A flaky pigment is suspended in a water solvent, and first a coupling agent is added or its solution is added dropwise to the suspension. Then, a phosphate having a perfluoroalkyl group or a silane compound is added or its solution is added dropwise thereto. During these coating treatments, the solution is adjusted to pH and temperature which are suitable for each material to be handled, and each material is stirred so that the pigment is uniformly coated therewith. After the coating treatments, the pigment is filtered, washed with water and dried in a usual manner to give the desired pigment.

With respect to the order of addition of the coupling agent and the compound having a perfluoroalkyl group, it is preferable to first coat the pigment with the coupling agent as outlined above because the pigment with even characteristics can be easily obtained. However, it is also possible to add both the compounds simultaneously or as a mixture.

6) Use of the Flaky Pigment as a Pigment for Resin Composition

As described above, the flaky pigment of the present invention is an material exhibiting its effects upon incorporation into a coating composition in an organic solvent system, a coating composition in an aqueous system and a composition, typically printing ink etc. containing resin as an component. Accordingly, the flaky pigment of the present invention can be used as a pigment added to coatings applied to various materials such as paper, wood plates, metal plates, cloth, leather and plastics and to a composition such as printing ink containing resin.

EXAMPLES

Hereinafter, the present invention is described in more detail by reference to the Examples, Comparative Examples and Test Example, which however are not intended to limit the present invention.

Example 1

An aqueous solution containing 5.68 g sodium hypophosphite ($NaH_2PO_2 \cdot H_2O$) was gradually added to 3 weight-% aqueous solution containing 5.76 g zirconium oxychloride ($ZrOCl_2 \cdot 8H_2O$) under stirring at room temperature so as not to cause white precipitates, to prepare a transparent aqueous solution. Then, 6.0 g of 35 to 37% aqueous hydrochloric acid solution was added to it to prepare a mixed solution of zirconium oxychloride and sodium hypophosphite.

Separately, 100 g rutile titanium oxide-coated mica titanium flakes (IRIODIN 225 Rutile Blue, a product of E. Merck) having a particle size of 10 to 60 μm exhibiting a blue reflection color and a yellow transmission color was suspended in 1000 ml water, and the temperature was raised to 75° C. under stirring. The suspension was adjusted to pH 3 with hydrochloric acid, and 1.14 g of 10 weight-% aqueous cerium chloride ($CeCl_3 \cdot 7H_2O$) was added thereto, and said mixed solution of zirconium oxychloride and sodium hypophosphite was added dropwise thereto for about 1 hour, during which the suspension was kept at pH 3 with 32 weight-% aqueous NaOH solution. After the whole mixed solution was added dropwise thereto, the mixture was stirred at 75° C. for 30 minutes, then 2 g γ-methacryloxypropyl trimethoxysilane ($CH_2=C(CH_3)COO(CH_2)_3Si(OCH_3)_3$ (Toray Dow Corning Ltd./SZ6030) was added thereto, and the mixture was stirred at 75° C. for 15 minutes and its pH was raised to 7.0 with NaOH. 10 weight-% aqueous solution of 10.00 g of perfluoroalkyl phosphate ($CF_3(CF_2)_7 CH_2CH_2O)_2PO[ONH_2(CH_2CH_2OH)_2]$ (UNIDIN TG101, Daikin Industries, Ltd.) was added dropwise to the suspension for about 1 hour, and the mixture was stirred at 75° C. for 30 minutes. The resulting solid product in the suspension was filtered, washed with water and dried at 130° C.

A pearlescent pigment excellent in dispersibility with powder exhibiting a blue reflection color and a yellow transmission color was obtained in the procedure described above. When this pigment was suspended in a low polar organic solvent such as toluene and xylene, the pigment particles floated on the surface of the solvent and were orientated densely, whereupon a designing ability excellent in brightness with the outstanding reflection color of the pearlescent pigment was confirmed.

Example 2

Using 100 g of the same rutile titanium oxide-coated mica titanium flakes (IRIODIN 225 Rutile Blue, a product of E. Merck) having a particle size of 10 to 60 μm exhibiting a blue reflection color and a yellow transmission color as in Example 1, the same procedure using the same amounts of the same materials as in Example 1 was conducted except that the perfluoroalkyl phosphate was replaced by 2 g perfluoroalkyl silane $CF_3(CF_2)_7(CH_2)_2Si(OCH_2CH_3)_3$ (Toray Dow Corning Ltd./AY43-158E).

A pearlescent pigment excellent in dispersibility with powder exhibiting a blue reflection color and a yellow transmission color was obtained in the procedure described above. When this pigment was suspended in a low polar organic solvent such as toluene and xylene, the pigment particles floated on the surface of the solvent and were orientated densely, whereupon a designing ability excellent in brightness with the outstanding reflection color of the pearlescent pigment was confirmed.

Example 3

An aqueous solution containing 5.68 g sodium hypophosphite ($NaH_2PO_2 \cdot H_2O$) was gradually added to 3 weight-% aqueous solution containing 5.76 g zirconium oxychloride ($ZrOCl_2 \cdot 8H_2O$) under stirring at room temperature so as not to cause white precipitates, to prepare a transparent aqueous solution. Then, 6.0 g of 35 to 37% aqueous hydrochloric acid solution was added to it to prepare a mixed solution of zirconium oxychloride and sodium hypophosphite.

Separately, 100 g iron oxide-coated mica flakes (IRIODIN 504 Red, a product of E. Merck) having a particle size of 10 to 60 μm exhibiting a wine red reflection color was suspended in 1000 ml water, and the temperature was raised to 75° C. under stirring. The suspension was adjusted to pH 3 with hydrochloric acid, and said mixed solution of zirconium oxychloride and sodium hypophosphite was added dropwise thereto for about 1 hour, during which the suspension was kept at pH 3 with 32 weight-% aqueous NaOH solution. After the whole mixed solution was added dropwise thereto, the mixture was stirred at 75° C. for 30 minutes, then 2 g γ-methacryloxypropyl trimethoxysilane (Toray Dow Corning Ltd./SZ6030) was added thereto, and the mixture was stirred at 75° C. for 15 minutes and its pH was raised to 7.0 with NaOH. 10 weight-% aqueous solution of 5.00 g of perfluoroalkyl phosphate (UNIDIN TG101, Daikin Industries, Ltd.) was added dropwise to the suspension for about 1 hour, and the mixture was stirred at 75° C. for 30 minutes. The resulting solid product in the suspension was filtered, washed with water and dried at 130° C.

A pearlescent pigment excellent in dispersibility with powder exhibiting a wine red reflection color was obtained in the procedure described above. When this pigment was suspended in a low polar organic solvent such as toluene and xylene, the pigment particles floated on the surface of the solvent and were orientated densely, whereupon a designing ability excellent in brightness with the outstanding reflection color of the pearlescent pigment was confirmed.

Comparative Examples

Comparative Example 1

Using 100 g of the same rutile titanium oxide-coated mica titanium flakes (IRIODIN 225 Rutile Blue, a product of E. Merck) having a particle size of 10 to 60 μm exhibiting a blue reflection color and a yellow transmission color as in Example 1, a pigment was obtained in the same manner using the same amounts of the same materials as in Example 1 except that the perfluoroalkyl phosphate was not used.

Comparative Example 2

Using 100 g of the same rutile titanium oxide-coated mica titanium flakes (IRIODIN 225 Rutile Blue, a product of E. Merck) having a particle size of 10 to 60 μm exhibiting a blue reflection color and a yellow transmission color as in Example 1, a pigment was obtained in the same manner using the same amounts of the same materials as in Example 1 except that the γ-methacryloxypropyl trimethoxysilane was not used.

Comparative Example 3

Using 100 g of the same iron oxide-coated mica flakes (IRIODIN 504 Red, a product of E. Merck) having a particle size of 10 to 60 μm exhibiting a wine red reflection color as in Example 3, a pigment was obtained in the same manner using the same amounts of the same materials as in Example 3 except that the perfluoroalkyl phosphate was not used.

Comparative Example 4

Using 100 g of the same iron oxide-coated mica flakes (IRIODIN 504 Red, a product of E. Merck) having a particle size of 10 to 60 μm exhibiting a wine red reflection color as in Example 3, a pigment was obtained in the same manner using the same amounts of the same materials as in Example 3 except that the γ-methacryloxypropyl trimethoxysilane was not used.

Test Examples

The pigments obtained in the Examples and the Comparative Examples were examined in each of the following tests using test methods described below. The results of each test are collectively shown in Table 1.

1) Water Resistance Test (Hot-water Immersion Test)

A thermosetting acrylic melamine resin (a mixture of Acrydic 47-712 and Super Beccamin G821-60 at a ratio of 7:3 by weight, Dainippon Ink and Chemicals, Inc.) was mixed at a concentration of 10% by weight was applied at a dry film thickness of about 15 μm on a zinc phosphate-treated steel plate (7 cm×15 cm) having been coated with black enamel at a dry film thickness of about 20 μm and baked at 160° C. for 20 minutes, and the plate was left for 5 minutes and coated by air spraying with 7 weight-% dispersion of the resulting pigment in xylene, left for 10 minutes and cured by heating at 140° C. for 30 minutes. The cured coated face was coated with a top clear coating of a thermosetting acrylic melamine resin (a mixture of Acrydic 47-179 and super Beccamin L117-60 at a ratio of 7:3 by weight, Dainippon Ink and Chemicals, Inc.) at a dry film thickness of about 30 μm, left for 10 minutes and cured by heating at 140° C. for 30 minutes.

The test plate produced in the method described above was immersed in hot water at 80° C. and kept therein for 8 hours, and then the temperature of hot water was decreased to room temperature, and the test plate was removed and visually checked to examine the change of its appearance.

Numerical values in Table 1 indicate that whitening/shrinkage performance is inferior in the order of from 10 to 1.

2) Adhesion

The coated face of the test plate prepared in the water resistance test was cut such that the cut reached the base material whereby 100 cut-line squares with a size of 1 mm×1 mm were made thereon, and a cellophane tape was attached to the surface and rapidly peeled off, and then the coated face was observed.

O indicates that 9 or less squares were removed, and x indicates that 10 or more squares were removed.

3) Hue Measurement (Chromatic Value)

C-value (chromatic value) was measured at an angle of incidence of 25° and at a light-receiving angle of 20° with a varied-angle color measurement meter $GCMS_3$ (Murakami Shikisai Co., Ltd.). The C value is indicative of the intensity of reflection color of the pearlescent pigment, and a large C value indicates stronger color. This is correlated with the denseness of particles due to the leafing effects of the pigment.

4) Designing Ability

The coating was visually evaluated. In Table 1, O indicates a designing ability excellent in plating-like brightness, and x indicates the designing ability of a usual pearlescent pigment.

TABLE 1

| Test Sample | Amount of Group (A) Used | Amount of Group (B) Used | Water Resistance Test Whitening/shrinkage | Adhesion | Hue Measurement C value | Designing Ability |
|---|---|---|---|---|---|---|
| Example 1 | 10 weight-% | 2 weight-% | 6/7 | ○ | 80.1 | ○ |
| Example 2 | 2 weight-% | 2 weight-% | 6/7 | ○ | 84.1 | ○ |
| Example 3 | 5 weight-% | 2 weight-% | 6/7 | ○ | 80.6 | ○ |
| Comparative Example 1 | — | 2 weight-% | 6/7 | ○ | 68.0 | x |
| Comparative Example 2 | 10 weight-% | — | 5/6 | x | 80.2 | ○ |
| Comparative Example 3 | — | 2 weight-% | 6/7 | ○ | 62.3 | x |
| Comparative Example 4 | 5 weight-% | — | 3/6 | x | 79.8 | ○ |

1) Group (A) indicates the amount of the organic compound having a perfluoroalkyl group in the Examples and Comparative Examples
2) Group (B) indicates the amount of the coupling agent in the Examples and Comparative Examples

INDUSTRIAL APPLICABILITY

It was found in the present invention that a novel flaky pigment having the leafing effects of flaky pigment particles on a coating and being excellent in the interlaminar adhesion between flaky pigment particles and a coated film is obtained by coating the surface of a flaky pigment with a combination of a coupling agent and an organic compound having a perfluoroalkyl group. By having such properties, the flaky pigment particles are orientated densely on the coating, thus reinforcing plating-like brightness and effectively exhibiting the pearlescence of particularly a pearlescent pigment. Further, the effect of improving the interlaminar adhesion prevents the exfoliation of a clear coating thereby achieving lasting brightness and improving the durability of a coating or printing ink.

The invention claimed is:

1. A flaky pigment for a resin composition, which comprises a flaky pigment substrate having a coating comprising a coupling agent sufficient to provide interlaminar adhesion of the coating and an organic compound having a perfluoroalkyl group.

2. The flaky pigment according to claim 1, wherein the flaky pigment substrate is a pearlescent pigment or a metal pigment.

3. The flaky pigment according to claim 1, wherein the flaky pigment substrate is a pearlescent pigment comprising hydrous zirconium oxide deposited on the surface of the pearlescent pigment formed by hydrolysis of a zirconium compound in the presence of hypophosphite, and/or a hydrous compound formed by hydrolysis of one or more water-soluble compounds of cobalt, manganese or cerium.

4. The flaky pigment according to claim 1, wherein the organic compound having a perfluoroalkyl group is a compound of the formula (I), (II), or (III):

a phosphate having a perfluoroalkyl group, of the formula (I):

$$[Rf(C_nH_{2n}O)_m]_yPO(OM)_{3-y} \quad (I)$$

wherein Rf represents a straight-chain or branched $C_6$–$C_{21}$ perfluoroalkyl group or perfluoroalkyloxy group, M represents hydrogen, an alkali metal, ammonium or a substituted ammonium, n is from 1 to 4, m is from 0 to 10, and y is from 1 to 3;

a phosphate having a perfluoroalkyl group, of the formula (II):

$$(RfSO_2NRC_nH_{2n}O)_yPO(OM)_{3-y} \quad (II)$$

wherein Rf represents a straight-chain or branched $C_6$–$C_{21}$ perfluoroalkyl group or perfluoroalkyloxy group, M represents hydrogen, an alkali metal, ammonium or a substituted ammonium, R represents hydrogen or a $C_1$–$C_3$ alkyl group, n is from 1 to 4, m is from 0 to 10, and y is from 1 to 3; or a perfluoroalkyl silane of the formula (III):

$$Rf(CH_2)_nSiX_3 \quad (III)$$

wherein Rf represents a straight-chain or branched $C_1$ to $C_{12}$ perfluoroalkyl group, X are the same or different and represent an alkoxy group, a halogen group or an alkyl group, provided that not all X groups are alkyl groups, and n is from 1 to 5.

5. The flaky pigment according to claim 1, wherein the coupling agent is at least one of a silane coupling agent, a titanium-based coupling agent or a zirconium-based coupling agent.

6. The flaky pigment according to claim 1, wherein the coupling agent and the organic compound are provided in an amount of 0.05–20% by weight relative to the flaky pigment.

7. The flaky pigment according to claim 6, wherein the organic compound having a perfluoroalkyl group is a compound of the formula (I), (II), or (III):

a phosphate having a perfluoroalkyl group, of the formula (I):

$$[Rf(C_nH_{2n}O)_m]_yPO(OM)_{3-y} \quad (I)$$

wherein Rf represents a straight-chain or branched $C_6$–$C_{21}$ perfluoroalkyl group or perfluoroalkyloxy group, M represents hydrogen, an alkali metal, ammonium or a substituted ammonium, n is 1–4, m is 0–10, and y is 1–3;

a phosphate having a perfluoroalkyl group, of the formula (II):

$$(RfSO_2NRC_nH_{2n}O)_yPO(OM)_{3-y} \quad (II)$$

wherein Rf represents a straight-chain or branched $C_6$–$C_{21}$ perfluoroalkyl group or perfluoroalkyloxy group, M represents hydrogen, an alkali metal, ammonium or a substituted ammonium, R represents hydrogen or a $C_1$–$C_3$ alkyl group, n is 1–4, m is 0–10, and y is 1–3; or a perfluoroalkyl silane of the formula (III):

$$Rf(CH_2)_nSiX_3 \quad (III)$$

wherein Rf represents a straight-chain or branched $C_1$–$C_{12}$ perfluoroalkyl group, X are the same or different and represent an alkoxy group, a halogen group or an alkyl group, provided that not all X groups are alkyl groups, and n is 1–5.

8. The flaky pigment according to claim 1, wherein the organic compound having a perfluoroalkyl group is $(CF_3(CF_2)_7CH_2CH_2O)_2PO[ONH_2(CH_2CH_2OH)_2]$ or $(CF_3(CF_2)_7 SO_2N(C_3H_7)C_2H_4O)_2PO(OH)$.

9. The flaky pigment according to claim 1, wherein the organic group having a perfluoroalkyl group is $CF_3(CF_2)_7(CH_2)_2Si(OCH_3)_3$,
$CF_3(CF_2)_{11}(CH_2)_2SiCl_3$,
$CF_3(CF_2)_4(CH_2)_2SiCl_3$,
$CF_3(CF_2)_2SiCl_3$,
$CF_3(CF_2)_{10}(CH_2)_2Si(OCH_3)_3$,
$CF_3(CF_2)_5(CH_2)_2Si(OCH_3)_3$,
$CF_3(CF_2)_9(CH_2)_2Si(OC_2H_5)_3$,
$CF_3(CF_2)_7(CH_2)_2Si(OC_2H_5)_3$,
$CF_3(CF_2)_4(CH_2)_2Si(OC_2H_5)_3$,
$CF_3(CF_2)_2(CH_2)_2Si(OC_2H_5)_3$, or
$CF_3(CH_2)_2Si(OCH_3)_3$.

10. The flaky pigment according to claim 1, wherein the pigment substrate comprises mica, graphite, alumina, silica, glass, iron oxide or barium sulfate.

11. The flaky pigment according to claim 1, wherein the pigment substrate comprises a flake form of aluminum, iron oxide, brass, stainless steel, titanium, boron nitride or copper powder.

12. The flaky pigment according to claim 1, wherein the flaky pigment has a particle diameter of 2–200 μm and a thickness of 0.2–1.0 μm.

13. The flaky pigment according to claim 1, wherein the coupling agent is:

methacryloxy alkoxypropyl trimethoxysilane,
γ-(2-aminoethyl)aminopropyl trimethoxysilane,
γ-(2-aminoethyl)aminopropylmethyl dimethoxysilane,
γ-methacryloxypropyl trimethoxysilane,
N-β-(N-vinylbenzylaminoethyl)-γ-aminopropyl trimethoxysilane,
γ-glycidoxypropyl trimethoxysilane,
γ-mercaptopropyl trimethoxysilane,
vinyl triacetoxysilane,
γ-chloropropyl trimethoxysilane,
octadecyldimethyl[3-(trimethoxysilyl)propyl]ammonium chloride,
γ-mercaptopropylmethyl dimethoxycine,
methyl trichlorosilane,
dimethyl dichlorosilane,
trimethyl chlorosilane, or
vinyl trimethoxysilane.

14. The flaky pigment according to claim 1, wherein the coupling agent is:

γ-(2-aminoethyl)aminopropyl trimethoxysilane,
γ-methacryloxypropyl trimethoxysilane, or
γ-glycidoxypropyl trimethoxysilane.

15. The flaky pigment according to claim 1, wherein the coupling agent is:

tetra((2,2-diallyloxymethyl-1-butyl)bis(di-tridecyl)phosphate) titanate,
bis(dioctylpyrophosphate) oxyacetate titanate, or
isopropyltri(N-aminoester-aminoethyl) titanate.

16. The flaky pigment according to claim 1, wherein the coupling agent is:

carboxyzircoaluminate or methacryloxyzircoaluminate.

17. A method for making a flaky pigment, comprising coating a flaky pigment substrate with a coupling agent and an organic compound having a perfluoroalkyl group, which bind a protective coating to the pigment substrate.

18. A method according to claim 17, wherein the coating is clear.

19. A flaky pigment for a resin composition, comprising a flaky pigment substrate coated with a coating comprising a coupling agent and an organic compound having a perfluoroalkyl group, wherein the flaky pigment substrate is a pearlescent pigment comprising hydrous zirconium oxide deposited on the surface of the pearlescent pigment formed by hydrolysis of a zirconium compound in the presence of hypophosphite, and/or a hydrous compound formed by hydrolysis of one or more water-soluble compounds of cobalt, manganese or cerium.

20. A printing ink or a coating composition comprising a flaky pigment according to claim 1.

* * * * *